G. A. MEAD.
CATENARY SUSPENSION FOR TROLLEY WIRES AND THE LIKE.
APPLICATION FILED NOV. 14, 1906.
945,972.
Patented Jan. 11, 1910.
2 SHEETS—SHEET 2.
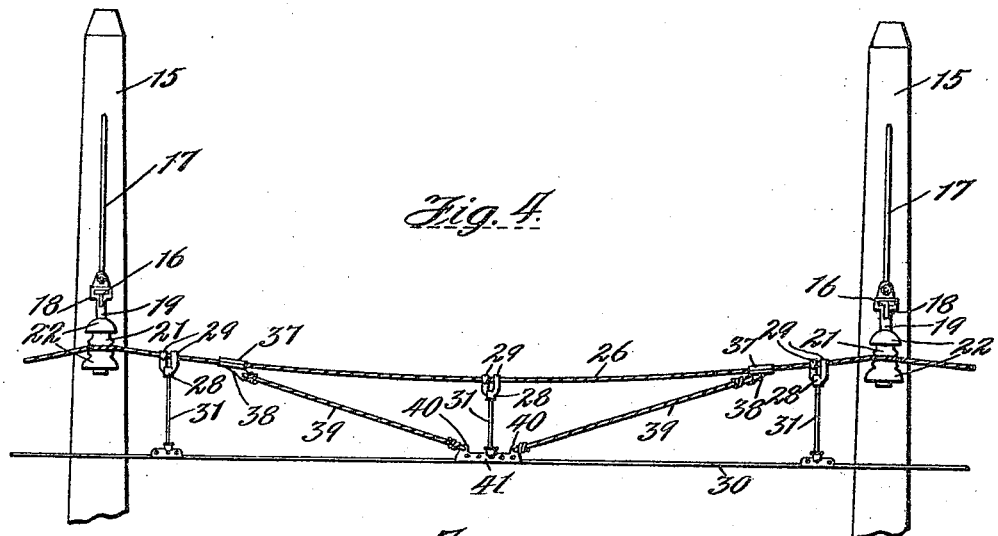
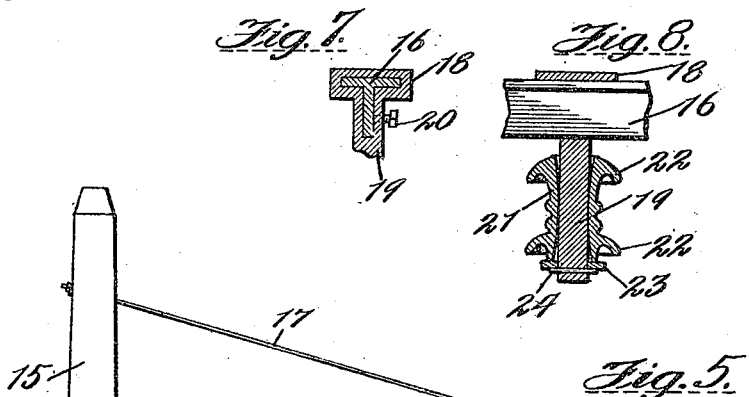
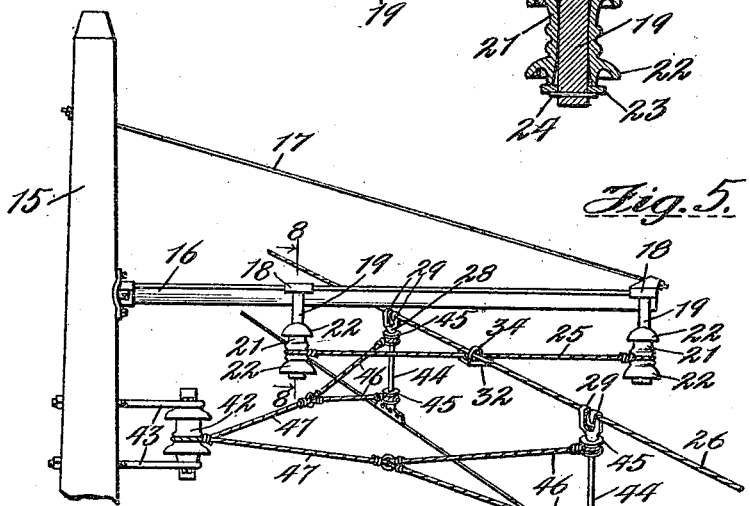
Witnesses:
Inventor:
G. A. Mead

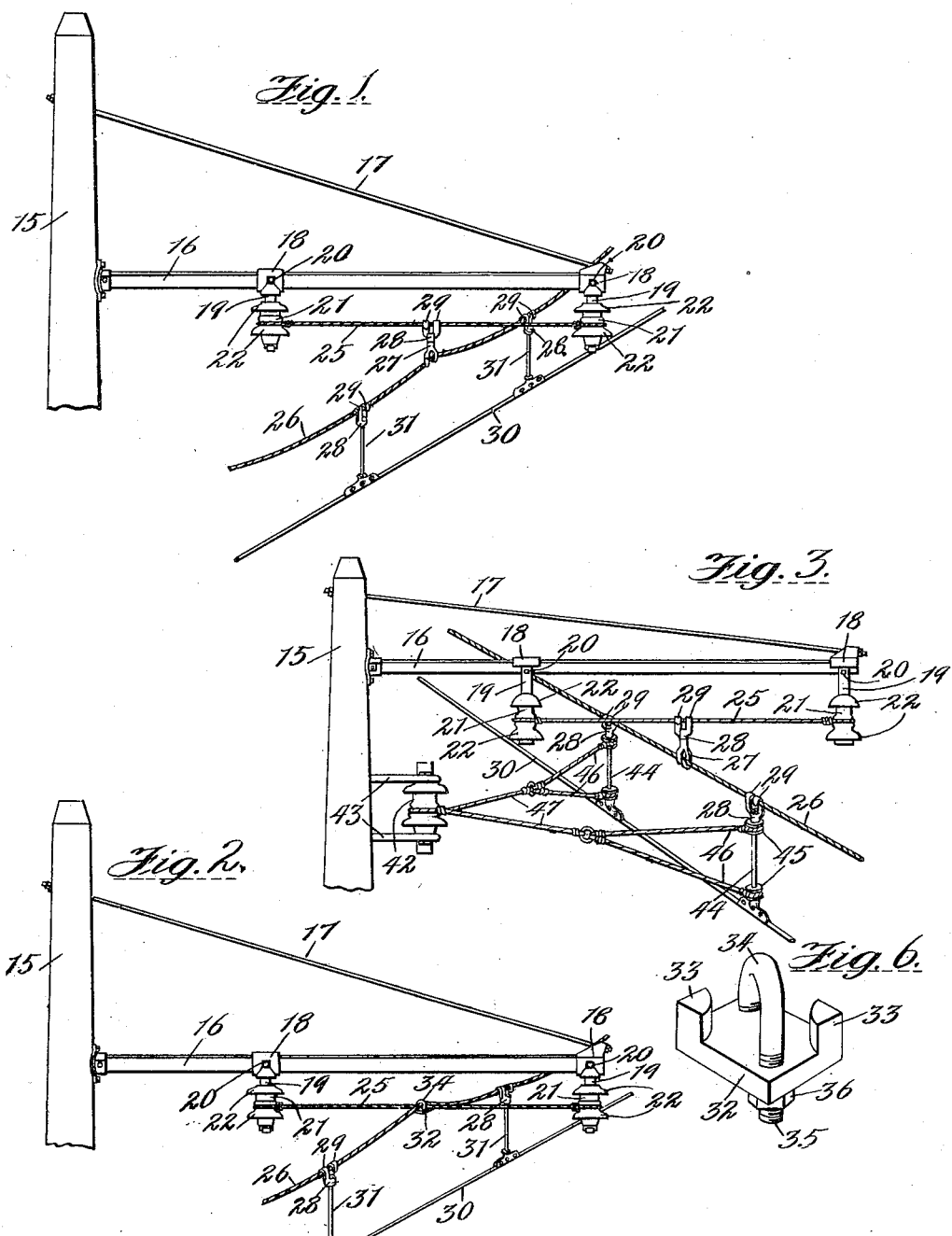

UNITED STATES PATENT OFFICE.

GEORGE A. MEAD, OF MANSFIELD, OHIO.

CATENARY SUSPENSION FOR TROLLEY-WIRES AND THE LIKE.

945,972.  Specification of Letters Patent.  Patented Jan. 11, 1910.

Application filed November 14, 1906.  Serial No. 343,366.

*To all whom it may concern:*

Be it known that I, GEORGE A. MEAD, a citizen of the United States, residing at Mansfield, in the county of Richland and State of Ohio, have invented certain new and useful Improvements in Catenary Suspension for Trolley-Wires and the Like, of which the following is a full, clear, and exact specification.

This invention relates to improvements in the construction of catenary suspension for trolley wires or the like, and the primary object of the invention is to provide an improved construction of this character for maintaining the trolley wire in a proper position for the operation of street cars or other vehicles, at high speeds.

A further object is to provide an improved construction of this character by means of which the trolley or conductor wire may be maintained in a staggered position with relation to the track, so that the wear may be uniformly distributed throughout the contact surface of the collector.

A further object is to provide improved means for preventing the trolley or conductor wire from swaying sidewise to too great an extent.

A further object is to provide improved means for maintaining the trolley and the messenger wire in a fixed relation to each other.

A further object is to provide improved means for insulating the trolley wire from the supporting means.

A further object is to provide an improved construction of this character which will be simple and cheap and efficient in operation.

To the attainment of these ends and the accomplishment of other new and useful objects, as will appear, the invention consists in the features of novelty in the construction, combination and arrangement of the several parts hereinafter more fully described and claimed, and shown in the accompanying drawings illustrating the exemplification of the invention, and in which—

Figure 1 is a view in side elevation of a construction of catenary suspension for trolley wires, embodying the principles of this invention, the supporting post being broken off. Fig. 2 is a view similar to Fig. 1 of a modified form of arrangement. Fig. 3 is a view of this improved construction illustrating one method of preventing the trolley wire from swaying. Fig. 4 is a front elevation of improved means for preventing the messenger and the trolley wire from becoming displaced longitudinally with relation to each other. Fig. 5 is a view similar to Fig. 3 of a modified form of arrangement. Fig. 6 is a detail view of a securing clip for the messenger wire. Fig. 7 is a detail sectional view of a portion of the insulator bracket and the supporting arm. Fig. 8 is a sectional view on line 8—8 of Fig. 5. Fig. 9 is a diagrammatic view showing a "bow-collector" in engagement with the trolley wire.

Referring more particularly to the drawings, the same reference numerals designate similar parts throughout the several views, and in these exemplifications of the invention the numeral 15 designates a suitable post to which is secured a suitable supporting arm 16, which latter may be braced by a rod or bar 17, one end of which is secured to the supporting arm, and the other end to the post 15 in any suitable manner. The arm 16 may be of any desired shape, but is preferably irregular in cross-section, as more clearly shown in Fig. 7, to prevent a rotative movement of the sleeves or collars 18, mounted thereon, and projecting from which are suitable brackets or supports 19, which latter are held from longitudinal movement on the arm 16 in any desired or suitable manner, preferably by suitable screws 20, passing through the sleeve or collar and engaging the arm 16. Any suitable number of these brackets or supports may be employed, and in the exemplification illustrated in Figs. 1, 2 and 5, two are shown, spaced from each other, and sleeved upon these brackets or supports 19 are suitable insulators 21 which are preferably provided with bell-shaped hoods or petticoats 22 arranged adjacent the ends thereof. These insulators may be secured to the brackets in any suitable manner, such as by means of a washer 23, upon which the insulator rests, and which latter is held in position by means of a pin 24 passing through the support, as more clearly shown in Fig. 8. Secured to and extending between these insulators and spaced from the arm 16, is a spanner member 25, preferably constructed of flexible material, such as wire or the like, and said spanner member or wire 25 serves as a support for the messenger wire 26.

In the exemplification shown in Figs. 1 and 3, the messenger wire 26 is suspended from the spanner member or wire 25 by means of a suitable hanger 27, which engages the messenger wire, and is provided with a clip 28 having hook-shaped arms 29 adapted to engage and clamp the said spanner member 25, the specific construction of which forms the subject matter of my co-pending application filed November 12, 1906, Serial No. 343,061. The trolley wire 30 is suspended and supported from the messenger wire 26, at suitable intervals, by suspension members 31, the specific construction of which also constitutes the subject matter of a separate application.

In the exemplification shown in Figs. 2 and 5, the messenger wire 26 rests upon and is supported by the spanner 25, and may be secured to the spanner in any suitable manner, such as by means of a clip comprising a body portion 32 having spaced ears or projections 33 between which the spanner member and the messenger wire 26 are adapted to stand. A substantially U-shaped bolt or clip 34 is adapted to extend over the member 25 and wire 26 and is provided with threaded extremities 35, adapted to pass through suitable apertures in the body portion, and nuts 36 are adapted to engage the threaded extremities for securing the parts in position. With such an arrangement the messenger wire may be adjusted back and forth on the span wire or member 25, which is particularly advantageous in catenary construction, especially when the current is collected from the trolley or conductor wire 30, with what is known as a "bow-collector" 37.

If the trolley is located directly over the center, or the same point of the track throughout the entire length, the wear upon the collector will be all at one point, whereas if it is possible to deflect or arrange the messenger or trolley wire in a staggered or zigzag relation to the track, the wear will not be confined to a single point, but will be distributed over the length of the collector according to the degree of deflection of the wire.

Any suitable means may be provided for preventing the trolley wire from becoming displaced longitudinally with relation to the messenger wire. A suitable and efficient means for accomplishing this end comprises clips 37 secured to the messenger wire and suitably spaced from one of the suspension devices 31. The clips 37 being provided with a perforated ear 38 to which is secured one end of a suitable flexible member 39, the other end of which is secured to a perforated portion 40 on the trolley wire clamp 41, of the suspension device 31. Any suitable number of these devices may be employed throughout the entire length of the line.

Any suitable means may be employed in order to maintain the trolley wire in its proper position and overcome its tendency to swing out or away from the pole on curve constructions. A simple and efficient means comprises an insulator 42, preferably similar in construction to the insulators 21, which is supported by the pole on suitable arms or brackets 43. The suspension devices 44 adjacent the pole are preferably provided with collars 45 adjacent the ends thereof, to which are secured one end of suitable flexible bracing or strain members 46 constituting a bridle. The free extremities of these members 46 are respectively secured to the ends of a flexible tie member 47, which latter is secured to the pole insulator 42 in any desired manner, preferably by passing around said insulator.

In order that the invention might be fully understood, the details of these embodiments thereof have been thus specifically described, but

What I claim is:—

1. In a device of the class described, the combination of a supporting upright, a bracket arm secured to and projecting therefrom, a guy rod secured to the upright and to the arm adjacent its free extremity, an insulator support secured adjacent the free end of the arm, a second insulator support slidable upon the arm and spaced from the first said insulator support, said insulator supports comprising depending pins, grooved insulators sleeved on said pins, a span wire connecting and encircling the insulators and resting in the grooves and a conductor suspended from said span wire.

2. In a device of the class described, the combination of a supporting upright, a bracket arm secured to and projecting therefrom, a guy wire secured to the upright and to the arm adjacent its free end, insulator supports slidable upon the arm and spaced from each other, means for securing the insulator supports spaced from each other, said supports comprising depending pins, grooved insulators sleeved upon the pins, means for securing the insulators against displacement, a span wire connecting and encircling the insulators and seated in the grooves in the insulators and a conductor wire suspended from said span wire.

3. In a device of the class described, the combination of a supporting upright, a bracket arm secured to and projecting therefrom, a guy-rod secured to the upright and to the arm adjacent its free extremity, an insulator support secured adjacent the free end of the arm, a second insulator support slidable upon the arm and spaced from the first said insulator support, said insulator supports comprising depending pins, grooved insulators loosely sleeved on said pins, a span wire connecting and encircling the insulators and resting in said grooves, a stranded messenger cable suspended from said span wire intermediate the insulators, and a conductor wire suspended from said messenger cable.

4. The combination of an upright support, a horizontal arm attached to said upright, slidably adjustable members provided with downwardly projecting pins mounted upon the horizontal arm, upright insulators provided with circumferential grooves mounted upon the said pins, means at the lower end of the projecting pin to removably secure the insulators in place, a span wire extending between and engaging with the grooves of said insulators, a slidably adjustable hanger attached to said span wire intermediate the insulators, a messenger cable attached to said hanger, a trolley hanger suspended from said messenger cable, a trolley attached to the hanger and a support rod secured to the upright support and to the arm adjacent its free extremity.

5. The combination of an upright support, a horizontal arm attached to said upright, slidably adjustable members provided with downwardly projecting pins mounted upon the horizontal arm, upright insulators provided with circumferential grooves loosely mounted upon said pins and for free movement longitudinally with respect to the pins, means at the lower end of the projecting pins to removably secure the insulators in place, a span wire extending between the insulators and engaging the grooves, a slidably adjustable hanger attached to said span wire intermediate the insulators, a messenger cable attached to said hanger, a trolley hanger suspended from said messenger cable, a trolley attached to said hanger, and a support rod secured to the upright support and to the arm adjacent its free extremity.

6. The combination of an upright support, a horizontal arm attached to said upright, slidably adjustable members provided with downwardly projecting pins mounted upon the horizontal arm, upright insulators provided with circumferential grooves loosely mounted upon said pins and for free movement longitudinally with respect to the pins, means at the lower end of the projecting pins to removably secure the insulators in place, a span wire extending between the insulators and engaging the grooves, a slidably adjustable hanger attached to said span wire intermediate the insulators, a messenger cable attached to said hanger, a trolley hanger suspended from said messenger cable, a trolley attached to said hanger, a support rod secured to the upright support and to the arm adjacent its free extremity, and means engaging said hanger and anchored to the said upright support for retaining the trolley in position.

7. In a device of the class described, the combination of a supporting upright, a bracket arm projecting from the upright, an insulator support supported adjacent the free end of the arm, a second insulator support slidable upon the arm and spaced from the first said insulator support, said insulator supports comprising depending pins, grooved insulators sleeved on said pins, a span wire connecting and encircling the insulators and resting in the grooves, and a conductor suspended from said span wire.

8. The combination of an upright support, a horizontal arm projecting from said upright, slidably adjustable members provided with downwardly projecting pins mounted upon the horizontal arm, upright insulators provided with circumferential grooves loosely mounted upon said pins for free movement longitudinally with respect to the pins, means at the lower end of the projecting pins to removably secure the insulators in place, a span wire extending between the insulators and engaging the grooves, a slidably adjustable hanger attached to said span wire intermediate the insulators, a messenger cable attached to said hanger, a trolley hanger suspended from said messenger cable, a trolley attached to said hanger, and means connected with the messenger and trolley and anchored to the upright for retaining the trolley in position.

9. The combination of an upright support, a horizontal arm projecting from said upright, slidably adjustable members provided with downwardly projecting pins mounted upon the horizontal arm, upright insulators provided with circumferential grooves loosely mounted upon said pins for free movement longitudinally with respect to the pins, means at the lower end of the projecting pins to removably secure the insulators in place, a span wire extending between the insulators and engaging the grooves, a slidably adjustable hanger attached to said span wire intermediate the insulators, a messenger cable attached to said hanger, a trolley hanger suspended from said cable, a trolley attached to said hanger, and means anchored to and insulated from the upright for retaining the trolley in position.

In testimony whereof I have signed my name to this specification, in the presence of two subscribing witnesses, on this 10th day of November A. D. 1906.

GEORGE A. MEAD.

Witnesses:
H. S. BLACK,
F. W. MILLER.